United States Patent Office 3,841,968
Patented Oct. 15, 1974

3,841,968
FERMENTATIVE PREPARATION OF L-ISOLEUCINE
Ichiro Chibata, Suita, Masahiko Kisumi, Kobe, Saburo Komatsubara, Kyoto, and Masaki Sugiura, Osaka, Japan, assignors to Tanabe Seiyaku Co., Ltd.
No Drawing. Continuation-in-part of abandoned application Ser. No. 201,400, Nov. 23, 1971. This application Aug. 21, 1972, Ser. No. 282,284
Int. Cl. C12d *13/06*
U.S. Cl. 195—29
10 Claims

ABSTRACT OF THE DISCLOSURE

An isoleucine hydroxamate-resistant mutant or an isoleucine hydroxamate- and α-aminobutyric acid-resistant mutant of *Serratia marcescens* is cultivated in an aqueous nutrient medium under aerobic conditions. 0.05 to 5 w./v. percent of L-threonine, L-homoserine or L-aspartic acid may be optionally added to the medium. The cultivation is preferably carried out at about 25° to 35° C. and at a pH of 6 to 9. L-isoleucine is recovered from the fermentation broth.

---

The present application is a continuation-in-part of application Ser. No. 201,400, filed Nov. 23, 1971, now abandoned.

This invention relates to the fermentative preparation of L-isoleucine.

L-isoleucine, one of the essential amino acids, has been employed as an active ingredient of medicinal preparations and as a food additive. Known chemical synthesis of this amino acid is disadvantageous in that four stereoisomers of isoleucine are formed during reactions and complicated procedures are required to separate biologically active L-isoleucine from the mixture of the isomers. It has been recognized, therefore, that a fermentative method is most advantageous and practical in the industrial preparation of L-isoleucine.

There have been known three methods in the fermentative preparation of L-isoleucine, but these methods necessarily require the use of a precursor in the fermentation. Known methods may be divided into two groups. One is the method of Japanese patent publication No. 6,593/1963 wherein cultivating a strain of Pseudomonas or Serratia genus in a nutrient medium containing D-threonine is employed. The other is the methods of Japanese patent publication Nos. 18,511/1961 and 5,167/1962 wherein cultivating a strain of Bacillus or Pseudomonas genus in a nutrient medium containing DL-α-aminobutyric acid is employed. Moreover, L-threonine can not be used as the precursor in the method of the former group. (Jap. Pat. Pub. No. 6,593/1963.)

As a result of various investigations, we have found that a mutant of *Serratia marcescens* resistant to isoleucine hydroxamate or resistant to both isoleucine hydroxamate and α-aminobutyric acid has an excellent productivity of L-isoleucine from a normal source of carbon. Additionally, we have also found that the L-isoleucine productivity of the mutant can be remarkably enhanced by carrying out the fermentation in the presence of L-threonine, L-homoserine or L-aspartic acid.

According to the present invention, L-isoleucine can be prepared by cultivating an isoleucine hydroxamate-resistant mutant or an isoleucine hydroxamate- and α-aminobutyric acid-resistant mutant of *Serratia marcescens* in a nutrient medium under aerobic conditions.

The isoleucine hydroxamate-resistant mutant of the present invention may be obtained by ultraviolet irradiation of a wild type strain of *Serratia marcescens* or by treating said wild type strain with a mutagen. For instance, a wild type strain of *Serratia marcescens* is treated with N-methyl-N'-nitro-N-nitrosoguanidine and then cultured at 30° C. for 3 to 5 days on agar plates containing the following compositions: $K_2HPO_4$, 0.7 w./v. percent; $KH_2PO_4$, 0.3 w./v. percent; $MgSO_4 7H_2O$, 0.01 w./v. percent; $(NH_4)_2SO_4$, 0.1 w./v. percent; glucose, 0.5 w./v. percent; L-isoleucine hydroxamate, 1 mg./ml. The isoleucine hydroxamate-resistant mutant of *Serratia marcescens* may be isolated as large colonies. Alternatively, the isoleucine hydroxamate- and α-aminobutyric acid-resistant mutant of the present invention may be isolated as large colonies when the isoleucine hydroxamate-resistant mutant is cultured at 30° C. for 2 to 3 days on the agar plates containing the same ingredients as mentioned above except that 10 mg./ml. of α-aminobutyric acid is employed instead of isoleucine hydroxamate. A viable culture of a isoleucine hydroxamate-resistant mutant of *Serratia marcescens* has been deposited with the American Type Culture Collection, 12301 Parklawn Drive, Rockville, Md. 20852 (hereinafter referred to as ATCC) under No. 21,741, and a viable culture of a isoleucine hydroxamate- and α-aminobutyric acid-resistant mutant of *Serratia marcescens* has also deposited at the same depository under ATCC No. 21,740 and ATCC No. 21,810.

The fermentation of the mutant of *Serratia marcescens* can be accomplished by either shaking cultivation or submerged fermentation under aerobic conditions. The fermentation may be preferably carried out at 25° to 37° C. and at a pH of 6 to 9. Calcium carbonate and ammonia may be employed for adjustment of the pH of the medium. The fermentation medium contains a source of carbon, a source of nitrogen and other elements. Suitable sources of carbon for the fermentation include glucose, starch hydrolysate, fumaric acid, citric acid and glycerol. Examples of suitable sources of nitrogen are urea, ammonium salts of organic acids (e.g., ammonium acetate, ammonium oxalate) and ammonium salts of inorganic acids (e.g., ammonium sulfate, ammonium nitrate). Preferred amount of the source of carbon and the source of nitrogen in the medium are respectively within the range of 2 to 15 w./v. percent and 0.5 to 2 w./v. percent. Furthermore, organic nutrients (e.g., corn steep liquor, peptone, yeast extracts) and/or inorganic elements (e.g., potassium phosphate, magnesium sulfate) may be added to the medium.

In carrying out the fermentation of the instant invention, L-isoleucine productivity of the above-mentioned mutants may be further enhanced by addition of about 0.05 to 5 w./v. of L-threonine, L-homoserine or L-aspartic acid. The fermentation of the invention can be accomplished in about 24 to 96 hours. L-isoleucine is accumulated in the fermentation broth.

After the fermentation is completed, cells and other solid culture compositions are removed from the fermentation broth by conventional procedures such as by heating, followed by filtration or centrifugation. Known procedures may be employed in the recovery and/or purification of L-isoleucine from the filtrate or the supernatant solution. For instance, the filtered fermentation broth is passed through or treated with a strong cation exchange resin. Then, the resin is eluted with a dilute alkaline solution such as aqueous ammonia. The eluates containing L-isoleucine are combined and concentrated. An alkanol such as methanol and ethanol is added to the concentrated solution. The precipitated crystals are recrystallized from an aqueous alkanol such as aqueous methanol and aqueous ethanol to yield pure crystals of L-isoleucine.

Practical and presently-preferred embodiment of this invention are illustratively shown in the following examples.

EXPERIMENT

*Serratia marcescens* OUT (Faculty of Engineering, Osaka University) 8259, the isoleucine hydroxamate-resistant mutant ATCC No. 21,741 of *Serratia marcescens* and the isoleucine hydroxamate- and α-aminobutyric acid-resistant mutant ATCC No. 21,740 of *Serratia marcescens* are respectively cultivated for 48 hours at 30° C. in a nutrient medium (pH 7.0) (Ingredients: glucose, 2 w./v. percent; dextrine, 7 w./v. percent; urea, 0.5 w./v. percent; corn steep liquor, 0.35 w./v. percent; dibasic potassium phosphate, 0.1 w./v. percent; magnesium sulfate, 0.05 w./v. percent; calcium carbonate, 2 w./v. percent) or in a nutrient medium (pH 7.0) containing the above-mentioned ingredients and 1.0 w./v. percent of L-threonine, L-homeserine or L-aspartic acid. The amount of L-isoleucine accumulated in the medium are shown in the following Table.

TABLE

The amount of L-isoleucine accumulated in the medium (mg./ml.)

| | Strains | | |
|---|---|---|---|
| Amino acid added | OUT 8259 | ATCC No. 21,741 | ATCC No. 21,740 |
| No addition | 0 | 0.1 | 2.5 |
| L-threonine | 0 | 4.0 | 7.0 |
| L-homoserine | 0 | 2.0 | 5.0 |
| L-aspartic acid | 0 | 1.5 | 3.5 |

Example 1

An aqueous nutrient medium comprising the following ingredients is prepared:

| | W./v. percent |
|---|---|
| L-threonine | 2 |
| Glucose | 2 |
| Dextrin | 10 |
| Urea | 0.5 |
| Dibasic potassium phosphate | 0.1 |
| Magnesium sulfate | 0.05 |
| Calcium carbonate | 2 |

The above medium is adjusted to pH 7.0. 15 ml. of the medium are charged into a 500 ml. shaking flask and its contents are sterilized by autoclaving. A loopful of the isoleucine hydroxamate-resistant mutant ATCC No. 21,741 of *Serratia marcescens* is inoculated aseptically into the medium. Then, the medium is cultivated for 48 hours at 30° C. under shaking. The fermentation medium thus obtained contains 7 mg./ml. of L-isoleucine.

1000 ml. of the fermentation medium are heated at 100° C. for 10 minutes and then filtered. The filtrate is introduced into a column (3 cm. x 45 cm.) of strong cation exchange resin (H-form) manufactured by Rohm & Haas Company under the trade name "Amberlite IR-120." After washing with water, the column is eluted with 5% aqueous ammonia. The fractions containing L-isoleucine are collected and concentrated under reduced pressure to about 80 ml. 100 ml. of aqueous methanol are added to the solution. The precipitating crystals are collected by filtration and then recrystallized from aqueous methanol. 5 g. of L-isoleucine are obtained.

$$[\alpha]_D^{20} = +40.1°$$

(C=1,6N-hydrochloric acid).

Example 2

An aqueous nutrient medium comprising the following ingredients is prepared:

| | W./v. percent |
|---|---|
| Glucose | 5 |
| Ammonium fumarate | 2 |
| Urea | 0.5 |
| Dibasic potassium phosphate | 0.1 |
| Magnesium sulfate | 0.05 |
| Calcium carbonate | 2 |

The above medium is adjusted to pH 7.0. 15 ml. of the medium are charged into a 500 ml. shaking flask and its contents are sterilized by autoclaving. A loopful of the isoleucine hydroxamate- and α-aminobutyric acid-resistant mutant ATCC No. 21,740 of *Serratia marcescens* is inoculated aseptically into the medium. Then, the medium is cultivated in the same manner as described in Example 1. The fermentation medium thus obtained contains 2.5 mg./ml. of L-isoleucine.

EXAMPLE 3

15 ml. of a nutrient medium comprising the same ingredients as described in Example 1 except that 4 w./v. percent of DL-threonine instead of L-threonine is prepared. After sterilization, a loopful of the isoleucine hydroxamate-resistant mutant ATCC No. 21,741 of *Serratia marcescens* is inoculated aseptically into the medium. Then, the medium is cultivated for 72 hours at 30° C. under shaking. The fermentation medium thus obtained contains 13 mg./ml. of L-isoleucine.

EXAMPLE 4

15 ml. of a nutrient medium comprising the same ingredients as described in Example 3 is prepared. After sterilization, a loopful of the isoleucine hydroxamate- and α-aminobutyric acid-resistant mutant ATCC No. 21,-740 of *Serratia marcescens* is inoculated aseptically into the medium. Then, the medium is cultivated in the same manner as described in Example 1. The fermentation medium thus obtained contains 25 mg./ml. of L-isoleucine.

EXAMPLE 5

An aqueous nutrient medium comprising the following ingredients is prepared:

| | W./v. percent |
|---|---|
| L-homoserine | 1 |
| Sorbitol | 8 |
| Powdered corn steep liquor | 0.35 |
| Urea | 0.5 |
| Dibasic potassium phosphate | 0.1 |
| Magnesium sulfate | 0.05 |
| Calcium carbonate | 2 |

The above medium is adjusted to pH 7.0. 15 ml. of the medium is charged into a 500 ml. shaking flask and its contents are sterilized by autoclaving. A loopful of the isoleucine hydroxamate- and α-aminobutyric acid-resistant mutant ATCC No. 21,740 of *Serratia marcescens* is inoculated aseptically into the medium. Then, the medium is cultivated in the same manner as described in Example 1. The fermentation medium thus obtained contains 4.5 mg./ml. of L-isoleucine.

EXAMPLE 6

An aqueous nutrient medium comprising the following ingredients is prepared:

| | W./v. percent |
|---|---|
| Glucose | 5 |
| Glycerol | 1 |
| Powdered corn steep liquor | 0.35 |
| Urea | 0.5 |
| Dibasic potassium phosphate | 0.1 |
| Magnesium sulfate | 0.05 |
| Calcium carbonate | 2 |

The above medium is adjusted to pH 7.0. 15 ml. of the medium are charged into a 500 ml. shaking flask and its contents are sterilized by autoclaving. A loopful of the isoleucine hydroxamate- and α-aminobutyric acid-resistant mutant ATCC No. 21,740 of *Serratia marcescens* is inoculated aseptically into the medium. Then, the medium is cultivated for 72 hours at 30° C. under shaking. The fermentation medium thus obtained contains 2.0 mg./ml. of L-isoleucine.

EXAMPLE 7

15 ml. of a nutrient medium comprising the same ingredients as described in Example 1 are prepared. After sterilization, a loopful of the isoleucine hydroxamate- and α-aminobutyric acid-resistant mutant ATCC No. 21,740 of Cerratia marcescens is inoculated aseptically into the medium. Then, the medium is cultivated in the same manner as described in Example 1. The fermentation medium thus obtained contains 15 mg./ml. of L-isoleucine.

1000 ml. of the fermentation medium are treated in the same manner as described in Example 1. 12 g. of L-isoleucine are obtained. $[\alpha]_D^{20} = +40.5°$ (C=4,6N-hydrochloric acid).

EXAMPLE 8

An aqueous nutrient medium comprising the following ingredients is prepared:

|  | W./v. percent |
|---|---|
| Glucose | 2 |
| Dextrin | 10 |
| Urea | 1.0 |
| Secondary potassium phosphate | 0.1 |
| Magnesium sulfate | 0.05 |
| Calcium carbonate | 2 |

The above medium is adjusted to pH 7.0. 15 ml. of the medium are charged into a 500 ml. shaking flask and its contents are sterilized by autoclaving. A loopful of the isoleucine hydroxamate- and α-aminobutyric acid-resistant mutant ATCC 21,810 of Serratia marcescens is inoculated aseptically into the medium. Then, the medium is cultivated at 30° C. for 48 hours under shaking. The fermentation medium thus obtained contains 6.5 mg./ml. of L-isoleucine.

EXAMPLE 9

An aqueous nutrient medium comprising the following ingredients is prepared:

|  | W./v. percent |
|---|---|
| Glucose | 4 |
| Dextrin | 10 |
| Urea | 1 |
| Secondary potassium phosphate | 0.1 |
| Magnesium sulfate | 0.05 |
| Calcium carbonate | 2 |

The above medium is adjusted to pH 7.0. 15 ml. of the medium are charged into a 500 ml. shaking flask and its contents are sterilized by autoclaving. A loopful of the isoleucine hydroxamate- and α-aminobutyric acid-resistant mutant ATCC 21,740 of Serratia marcescens is inoculated aseptically into the medium. Then, the medium is cultivated at 30° C. for 48 hours under shaking. The fermentation medium thus obtained contains 3.8 mg./ml. of L-isoleucine.

What we claim is:

1. A process for preparing L-isoleucine which comprises cultivating an isoleucine hydroxamate-resistant mutant or an isoleucine hydroxamate- and α-aminobutyric acid-resistant mutant of Serratia marcescens in a nutrient medium under aerobic conditions to produce a fermentation broth, and recovering accumulated L-isoleucine from the fermentation broth.

2. The process according to claim 1, wherein the mutant is Serratia marcescens ATCC No. 21,740.

3. The process according to claim 1, wherein the mutant is Serratia marcescens ATCC No. 21,741.

4. The process according to claim 1, wherein the mutant is Serratia marcescens ATCC No. 21,810.

5. The process according to claim 1, wherein the cultivation is carried out in the presence of 0.05 to 5 w./v. percent of L-threonine, L-homoserine or L-aspartic acid.

6. The process according to claim 1, wherein the cultivation is carried out at about 25° to about 35° C.

7. The process according to claim 1, wherein the cultivation is carried out at a pH of 6 to 9.

8. The process according to claim 1, wherein the cultivation is carried out in the presence of 0.05 to 5 w./v. percent, based on the medium, of L-threonine, L-homoserine or L-aspartic acid at about 25° to about 35° C. and at a pH of 6 to 9.

9. A process for preparing L-isoleucine which comprises cultivating isoleucine hydroxamate-resistant mutant ATCC No. 21,741 of Serratia marcescens in a nutrient medium containing 0.05 to 5 w./v. percent of L-threonine, L-homoserine or L-aspartic acid under aerobic conditions at about 25° to about 35° C. and at a pH of 6 to 9 to produce a fermentation broth, and recovering accumulated L-isolucine from the fermentation broth.

10. A process for preparing L-isoleucine which comprises cultivating isoleucine hydroxamate- and α-aminobutyric acid-resistant mutant ATCC No. 21,740 of Serratia marcescens in a nutrient medium containing 0.05 to 5 w./v. percent, based on the medium, of L-threonine, L-homoserine or L-aspartic acid under aerobic conditions at about 25° to about 35° C. and at a pH of 6 to 9 to produce a fermentation broth, and recovering accumulated L-isoleucine from the fermentation broth.

References Cited
UNITED STATES PATENTS 3,086,918    4/1963    Chibata et al. _____ 195—47

ALVIN E. TANENHOLTZ, Primary Examiner

U.S. Cl. X.R.

195—30, 47, 112